Nov. 1, 1966  P. H. MILLER, JR  3,282,371
METHOD OF AND APPARATUS FOR GENERATING SEISMIC WAVES
Original Filed June 25, 1962  2 Sheets-Sheet 1
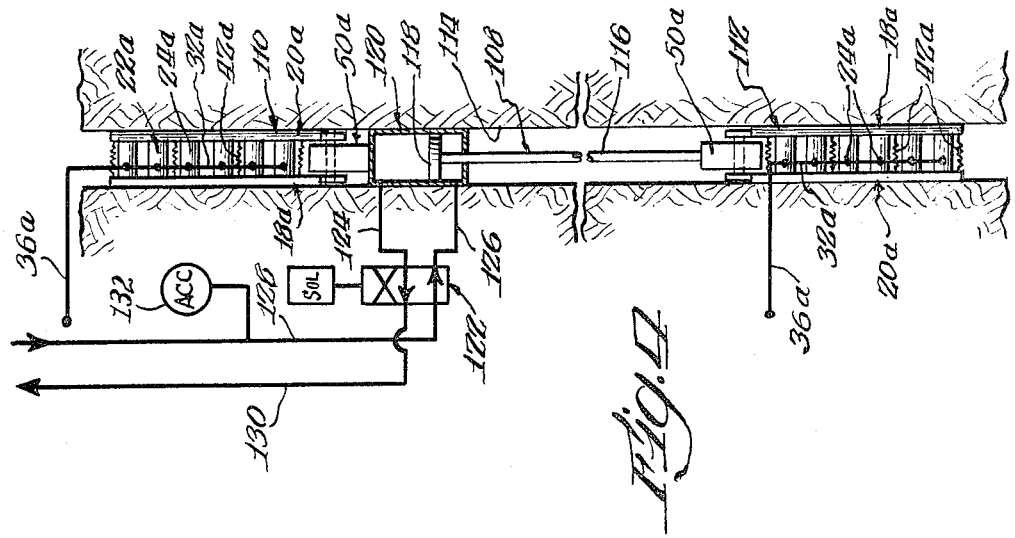
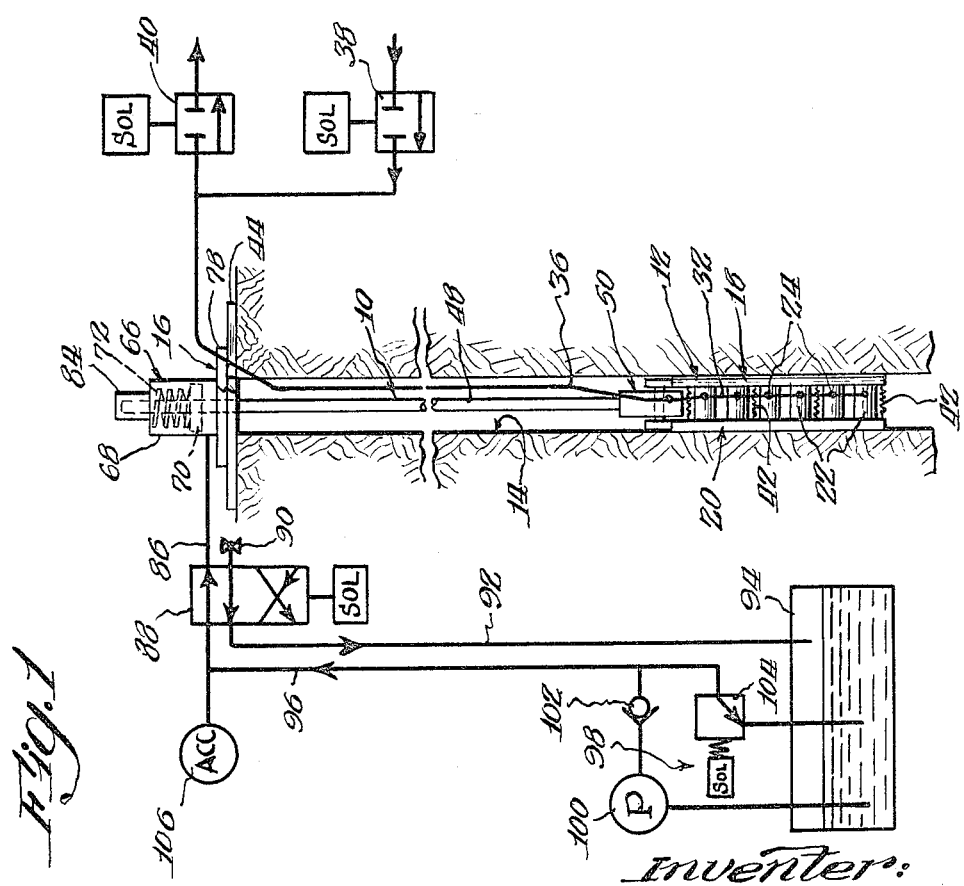
Inventor:
Park H. Miller, Jr.
By Soans, Anderson, Luedeka & Fitch
Attys.

Nov. 1, 1966   P. H. MILLER, JR   3,282,371
METHOD OF AND APPARATUS FOR GENERATING SEISMIC WAVES
Original Filed June 25, 1962   2 Sheets-Sheet 2
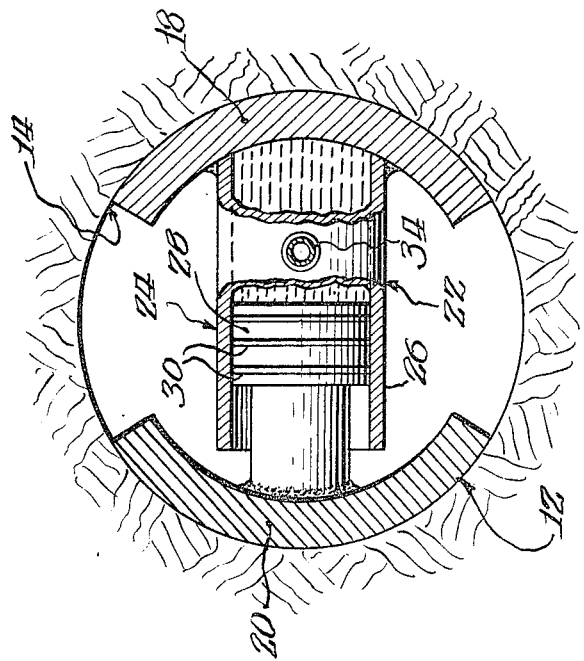
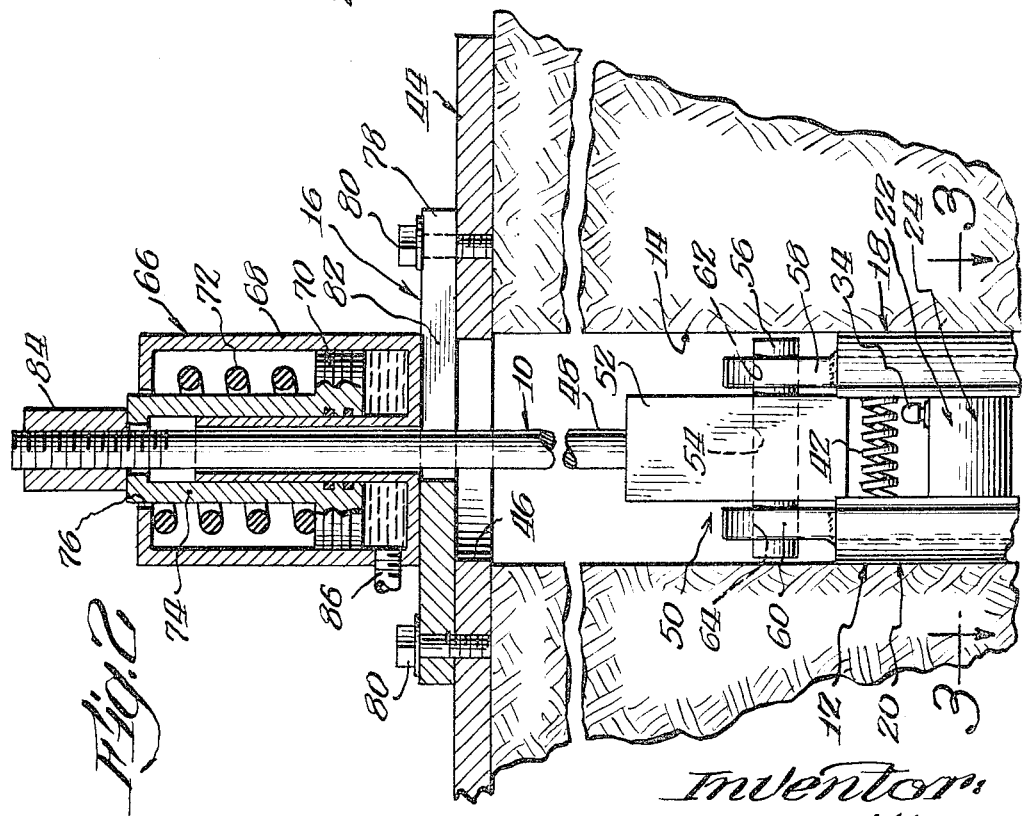
Inventor:
Park H. Miller, Jr.
By Sears, Anderson, Luedeka & Fitch
Attys.

United States Patent Office 3,282,371
Patented Nov. 1, 1966

3,282,371
METHOD OF AND APPARATUS FOR GENERATING SEISMIC WAVES
Park H. Miller, Jr., Del Mar, Calif., assignor to General Dynamics Corporation, New York, N.Y., a corporation of Delaware
Continuation of application Ser. No. 204,739, June 25, 1962. This application July 21, 1965, Ser. No. 477,347
10 Claims. (Cl. 181—.5)

This application is a continuation of copending application Serial No. 204,739, now abandoned.

The present invention relates to geophysical prospecting and more particularly to an improved method of, and apparatus for generating seismic waves.

Geophysical prospecting is a technique employed to determine the sub-surface structure of the earth, such as the geometry of sedimentary strata. This information is a valuable guide to the location of natural resource deposits, such as ore deposits, petroleum deposits, etc.

The technique comprises the transmitting of vibratory energy into the earth and recording and interpreting the vibrations that return to the surface after reflection from, or refraction along, boundaries between geological formations.

Seismic waves are conventionally introduced into the earth by exploding a high explosive in a shot hole drilled to a depth of up to several hundred feet into the earth. There are many disadvantages inherent to this type of seismic wave source. Perhaps the most important of these is the fundamentally "one-shot" nature of the process. Frequently the hole caves in from the explosion, necessitating expensive redrilling for subsequent shots. Even if the condition of the hole permits reloading, the shock wave from the previous explosion has permanently altered the ground nearby and the second record is likely to differ materially from the first. In addition, explosives are expensive forms of energy, and are expensive to handle and especially to transport to remote areas.

A second severe disadvantage to using explosives is that the seismologist has little or no control over the frequencies generated by the source. The pressure generated in the shot hole is complicated, but usually resembles a spike and square wave combined. As a result, a great deal of energy is put into high frequencies where is is useless for seismic reflections. The energy in the useful frequency range is also of more than one frequency and hence most of the information that could be obtained from interference between the waves reflected from adjacent boundaries is lost.

Arrays of monochromatic sources can be used to make beams of sound. Such arrays could be used to great advantage in seismic work. Since the spacing of the elements in such an array depends on the wavelength, which is inversely proportional to the frequency, such a system is much more effective with a monochromatic source of sound than with a non-monochromatic one.

In geophysical prospecting, background noise from earthquakes, highway traffic, airplanes, earthmoving, drilling operations, etc., often makes it difficult to distinguish the useful reflected or refracted signal at the recorder. The reflected or refracted signals may be more easily distinguished from the noise by providing a repetitive source of seismic waves. In this connection, if many records are available with the same time signal superimposed on a random noise background, the signal may be extracted from the noise by well known statistical methods. However, the economics of the explosive method severely limits the use of repetitive shooting to improve the signal to noise ratio.

If an array of sources is used to form a beam, it is necessary to aim the beam in various directions on successive shots in order to explore the structure in all directions from the array. Again this requires repetitive measurements. If the frequency generated by the source is controllable, it is desirable to make measurements at various frequencies, especially if one wishes to interpret interference patterns. This again requires multiple measurements.

Some of the disadvantages inherent in the use of explosives have been apparent to those skilled in the seismic art, and there have been various attempts to provide an improved source of seismic waves.

In one system, a frequency modulated, sinusoidal pressure is applied to the surface of the earth. The source includes two counter-rotating, eccentrically mounted fly wheels which are brought up to speed and then rapidly slowed down to provide frequency modulation. The repetitive nature of this system allows averaging to improve the signal to noise ratio. However, this system has other important disadvantages. First, the pressure may only be applied to the surface or weathered layer of the earth, because the source is of such a size that it is impossible to lower it into a bore hole. The weathered layer often distorts geophysical measurements in amounts disproportionate to its thickness.

Second, and the most important disadvantage of this device is its weight. The maximum peak to peak force exerted by such a device is limited to twice its weight. If this limit is exceeded it will leave the ground. Since the energy radiated in seismic waves is proportional to the square of the peak to peak force, any reduction in the weight of the device greatly reduces the radiated energy. The radiated energy from such devices is uncomfortably small even when their weight is a few tons—which is already too heavy for easy portability.

In another repetitive system, a heavy weight is dropped upon the surface or weathered layer of the earth. This method also provides a seismic source which is heavy, operable only on the surface, and not capable of providing a pressure which is programmed in time.

A further repetitive system involves a flexible bag filled with water and lowered to the bottom of a bore hole. An anchoring mechanism is inserted to hold the bag down. This bag is then pressurized cyclically. This method allows the source to be put at any depth in the ground, and allows an arbitrary program of pressure with time. However, this method suffers from a very severe disadvantage, namely, that the pressure and hence the radiated energy is limited to a very low value by the strength of the bag, which is made of relatively very weak materials, such as rubber. Unless the bag is perfectly constrained by the hole walls and bottom and the anchor, the bag extrudes into some crack and breaks even if it is not punctured by some imperfection on the wall of the bore hole. If the anchor is omitted, the pressure is even more limited since then the bag may bulge at the top and break. In any event, the pressure is limited by the strength of the anchor and the strength of its attachment to the walls of the hole. Finally, the source must be operated at the bottom of the bore hole which is a clear disadvantage in some circumstances.

It is the general object of the present invention to provide an improved method of, and apparatus for, applying stresses to the earth for the purpose of generating seismic waves. Another object of the invention is to provide an improved method of, and apparatus for, generating seismic waves which allows repetitive, identical "shots."

Another object of the invention is the provision of a repetitive source of seismic waves which is capable of being operated in a bore hole.

Still another object is the provision of a source of seismic waves which is sufficiently powerful to obtain deep reflection in the earth. Still another object of this invention is the provision of a method of and apparatus for applying the stresses to the earth which are not limited in magnitude by the weight of the apparatus or by the strength of the materials, since many materials of high yield strength can be used in forming the apparatus. A further object is the provision of a method of and apparatus for applying stresses to the earth which are an arbitrary function of time.

A further object is the provision of a seismic wave source which is capable of generating substantially single frequency waves and a method of generating such waves. Still a further object is the provision of a seismic wave source which is small, light and relatively inexpensive to manufacture and operate.

Other objects and advantages of the present invention will become apparent by reference to the following description and accompanying drawings.

In the drawings:

FIGURE 1 is an elevational schematic illustration of one embodiment of apparatus which may be employed to practice the method in accordance with the present invention;

FIGURE 2 is an enlarged fragmentary view of a portion of the apparatus shown in FIGURE 1;

FIGURE 3 is an enlarged cross sectional view taken generally along line 3—3 of FIGURE 2; and FIGURE 4 is an elevational schematic illustration of another embodiment of an apparatus which may be employed to practice the method in accordance with the present invention.

In accordance with the present invention, a method is provided for generating seismic waves, which method comprises applying a time-varying tension or compression to link means extending between two anchor points on or in the earth, or one point on the earth and one point in the earth, thereby stressing the earth between the anchor points and generating a seismic wave.

In order to facilitate the description of the method in accordance with the present invention, an apparatus is decribed hereinafter which may be employed to practice the method. In the embodiment illustrated in FIGURE 1, a seismic wave is generated by applying a time-varying tension to a link means 10 connected at its lower end to an anchor 12 disposed in a hole 14 drilled in the earth. The upper end of link means 10 is engaged with an anchor 16 disposed on the surface of the earth directly above the lower anchor 12.

In the illustrated embodiment, the lower anchor 12 is a hydraulically actuated expander which applies pressure to the side wall of the hole 14 to thereby grip the earth. The illustrated expander 12 includes a pair of opposed, vertically extending pusher members 18 and 20 of a structural material such as steel, aluminum, etc. As illustrated in FIGURES 1 and 3, the pusher members 18 and 20 are plates which have generally the same shape, and in this connection, each of the pusher plates 18 and 20 is generally arcuate in horizontal cross section. Each of the plates 18 and 20 forms a sector of an annulus having an outer radius equal to or slightly less than that of the hole 14. Preferably, so that the pusher plates 18 and 20 do not ruin the hole, the length of the sector of the annulus is made greater than one-fourth of the annulus.

The pusher plates 18 and 20 are reciprocated by a power means 22 which, in the illustrated embodiment, includes six vertically aligned, spaced apart piston-cylinder arrangements 24. The piston-cylinder arrangements 24 may be of the conventional single-acting type. As shown in FIGURE 3, the concave surface of one of the pusher plates 18 is connected to the closed ends of six horizontally extending hydraulic cylinders 26 by suitable means, such as welding. The concave surface of the other pusher plate 20 is suitably connected to the outer ends of six horizontally extending pistons 28 which are slidably received within the respective cylinders 26. Piston rings 30 of suitable material, such as rubber, are provided on each of the pistons 28. The pistons and cylinders are made of a suitable structural material, such as steel, aluminum, etc.

As shown in FIGURE 1, the illustrated cylinders 26 are interconnected in fluid communication by a vertical extending header or tube 32 which is connected to the individual cylinders by branch lines 34. Pressurized hydraulic fluid is supplied to the cylinders by means of a hydraulic line or tube 36 which is connected by one end to the upper end of the header 32 and extends vertically therefrom to the surface of the earth. The other end of the line 36 is connected through an inlet valve 38, which may be a conventional solenoid controlled two-position shutoff valve, to a source (not shown) of pressurized hydraulic fluid. The line 36 is also connected through an exhaust valve 40, which may be a conventional solenoid operated two-position valve, to a sink (not shown) for the hydraulic fluid.

So that the expander 12 may be easily removed from the hole 14, the pusher plates 18 and 20 are biased in an inward direction by four relatively weak tension springs 42, which are suitably connected to the pusher plates. Thus, when the hydraulic pressure is completely released, the pusher plates 18 and 20 are retracted by the springs. Other means may be employed to retract the plates. For example, one could utilize a double acting cylinder and retract the pusher plates by hydraulic pressure provided by an auxiliary pump or suitable valving. Also, one might apply a vacuum to the hydraulic system and thereby allow the pusher plates to retract under atmospheric pressure.

By applying hydraulic pressure to the cylinder-piston arrangement 24 the pusher plates 18 and 20 are pressed against the side wall of the hole 14. The expander 12 becomes imbedded slightly in the wall of the hole and this imbedding of the expander plus the frictional force between the plates and the earth provide a very good holding action. The coefficient of friction between the wall and the pusher plates 18 and 20 is normally greater than one, and hence a vertical force at least equal to the horizontal force applied by the pusher plates to the wall may be applied to the expander 12 without moving the same.

As shown in FIGURE 1, the upper anchor 16 is disposed on the surface of the earth surrounding the hole 14. The upper anchor 16, which is illustrated particularly in FIGURE 2, includes a horizontally disposed generally cylindrical radiating plate 44 of structural material which rests on the ground at the top of the hole 14. An aperture 46 is provided in the center of the radiating plate 44, which aperture corresponds in size to the hole in the ground. The lower anchor 12 may thus be inserted into or removed from the hole 14 without moving the radiating plate 44.

In the embodiment illustrated in FIGURES 1 to 3, the lower anchor 12 and the upper anchor 16 are linked together by the link means 10. The illustrated link means 10 includes a vertically extending tension or connecting rod 48 which is connected by its lower end to the upper end of the expander 12 and is engaged by its upper end with the upper anchor 16. The connecting rod is connected to the expander 12 by means of a yoke 50 which transmits the tension force directly to the pusher plates 18 and 20 and also permits the pusher plates to be moved relative to each other.

As shown particularly in FIGURE 2, the yoke 50 includes a vertically extending cylindrical member 52 which is suitably connected to the lower end of the connecting rod 48. The cylindrical member 52 is provided with a transversely extending hole 54 near its lower end which carries a horizontally extending cross head pin 56. The upper ends of the plates 18 and 20 are provided with extensions 58 and 60, respectively, which serve as a crosshead for the yoke 50. The extensions 58 and 60 are vertical segments of cylinders which are telescoped in the upper ends of the pusher plates 18 and 20 and are suitably joined thereto, as by welding. The extensions 58 and 60 are provided with corresponding horizontally extending apertures 62 and 64, respectively, which receive the cross head pin 56.

As shown in FIGURES 1 and 2, the upper end of the connecting rod 48 is linked with the radiating plate 44 by means 66 for generating a vertical force. In the illustrated embodiment, the force generating device 66 is a ram which is disposed around the end portion of the connecting rod 48. The rod 48 is made of a length such that a portion of the rod extends above the ram 66. The ram 66, which may be of a conventional type, includes a hollow tubular housing 68 which serves as a cylinder, and is disposed concentrically of the connecting rod 48. A piston 70 is disposed within the cylinder 68 and is biased in a downward direction by means of a spring 72. A tubular piston rod 74 is connected to the piston 70 and extends upwardly through an opening 76 in the upper end of the housing 68.

The ram 66 is supported by a horizontally extending, generally cylindrical base plate 78 which, in turn, is supported by the radiating plate 44. The base plate 78 is suitably secured to the radiating plate 44 as by bolts 80. The base plate 78 is provided with a radially extending slot 82 which permits the base plate 78 to be inserted in position after the lower anchor 12 is lowered into the ground.

Upward movement of the piston rod 74 is transmitted to the connecting rod 48 by means of a tubular end fitting 84 which engages the top of the piston rod. The end fitting 84 is removably fastened to the connecting rod as by threading.

The ram 66 in the illustrated embodiment is operated by a hydraulic system which provides two-position operation of the ram 66. The cylinder 68 of the ram 66 is connected through a line 86 to a cylinder port of a master control valve 88 which may be a conventional solenoid operated four-way, two-position valve. The other cylinder port of the valve 88 is blocked by suitable means, such as a plug 90. The exhaust port of the valve 88 is connected by a line 92 to a reservoir 94.

The inlet port of the valve 88 is connected through a line 96 to a source 98 of pressurized hydraulic fluid. The source 98 is includes a pump 100 which is connected through a check valve 102 to the line 96. The inlet of the pump 100 is connected to the reservoir 94. The line 96 is also connected to a conventional solenoid operated, maximum pressure relief valve 104 which exhausts to the reservoir 94. A conventional accumulator 106, which serves as a secondary source of pressurized fluid, is connected to a junction in the line 96.

In operation, the lower anchor 12 is lowered into a hole 14 in the ground through the aperture 46 in the radiating plate 44. Cables (not shown) may be attached to the anchor plates 18 and 20 to facilitate handling of the anchor. The inlet valve 38 is then opened thereby supplying hydraulic fluid to the expander 12 and causing the same to press against the earth, thereby imbedding the plates 18 and 20 slightly in the wall of the hole. The base plate 78 is then disposed on the top of the radiating plate 44 and the ram 66 is lowered over the top of the connecting rod 48. The end fitting 84 is then screwed on the end of the connecting rod 48.

Hydraulic pressure is conducted to the ram by shifting the master valve 88. The hydraulic ram then tensions the connecting rod 48, thereby vertically stressing the earth between the radiating plate 44 and the lower anchor 12. The pressure in the ram 66 and hence the stress on the earth is then quickly released by shifting the master control valve 88, thereby exhausting the fluid into the reservoir 94. A seismic wave is radiated as the strain in the ground is applied or relieved. By both mathematical analysis and experiment, the radiating plate 44 is more effective than the lower anchor 12 in radiating compression seismic waves. A greater amplitude wave is radiated downwardly than is radiated horizontally (which is desirable for seismic work), and the two waves are of opposite phase. Since there is a time lag between the arrival of the waves from the two sources at a reflector because of their separation, the waves may be made to add by separating the anchors by one half a wave length. The pressure release time may be controlled by selection of valve sizes so that the pressure drop is rich in frequency components of a useful range.

In one illustrated embodiment of a seismic wave source, a 6 inch diameter hole is drilled 20 feet into the ground. The expander includes a pair of steel pusher plates, each of which is approximately ½ of an inch in thickness, 48 inches in height, and 4.7 inches in length of arc. Each of the plates is formed on a radius of approximately 6 inches. Each of the six cylinders has a cross sectional area of 2.7 square inches. A pressure of 2500 pounds per square inch is applied to each piston and this results in a force of approximately 40,000 pounds being applied to the earth by each of the pusher plates. The connecting rod is made of steel and is approximately 1 inch in diameter and 12 feet in length. The radiating plate is approximately 27 inches in diameter. An upward or tension force of approximately 12,000 pounds is applied to the connecting rod. This force is released in approximately $5 \times 10^{-3}$ seconds.

It should be understood that, while in the above described embodiment a step pressure wave is provided, the hydraulic pressure supplied to the ram may be programmed so as to generate any predetermined sequence of pressure by methods familiar to those proficient in hydraulic engineering. A particularly useful sequence is a gated continuous wave train having a single frequency. In this sequence, the hydraulic pressure may be oscillated between predetermined pressures to provide the gated continuous wave train. A frequency-modulated wave train may be provided by changing the frequency of oscillation.

Moreover, in accordance with the present invention, a tensioning force may be applied to the link means by other types of systems, such as a pneumatic system, mechanical system, etc. Also, other types of anchors may be employed for either the top and/or the bottom anchor.

In a second embodiment of the apparatus, which is shown in FIGURE 4, a tensioning or compressing force is applied to a link means 108, interconnecting an upper anchor 110 and a lower anchor 112, both of which are disposed in a hole 114 in the earth. This apparatus is capable of being lowered down a hole in the earth to directly stress and radiate in deeper strata.

As illustrated in FIGURE 4, the lower anchor 112 and the upper anchor 110 are of the same construction as the lower anchor employed in the embodiment shown in FIGURE 1, except that the upper anchor 12 is inverted. Parts similar to those shown in FIGURE 1 are indicated with the same reference numeral with the suffix "a."

The anchors 110 and 112 are connected together by the link means 108 which includes a connecting rod 116. The rod 116 is connected by its lower end to a yoke 50a connected to the upper end of the lower anchor 112. The upper end of the rod is connected to a piston 118 of a double acting cylinder 120. The blind end of the cylinder 120 is connected by means of a yoke 50a to the lower end of the upper anchor 110. Pressure applied to the pusher plates 18a and 20a of the anchors 110 and 112 may be controlled by the hydraulic system described above in connection with FIGURE 1.

The connecting rod 116 is tensioned by applying hydraulic pressure to the front end of the cylinder 120. The tension is released by releasing the pressure in the front end and applying pressure to the blind end of the cylinder 120.

In the illustrated embodiment the application of pressure to the cylinder 118 is controlled by a hydraulic system, most of which is disposed in the hole. For clarity, the hydraulic system is shown away from the hole. The hydraulic system includes a master control valve 122 which may be a conventional solenoid operated four way two-position valve. The cylinder ports of the valve 122 are connected to the cylinder 120 by suitable lines 124 and 126. The inlet port and the exhaust port of the valve are connected, respectively, by lines 128 and 130 to a source (not shown) and a sink (not shown) of hydraulic fluid. An accumulator 132 is disposed in the inlet line 128 to reduce the pump capacity necessary to operate the cylinder 120 when operations is intermittent.

Since the two anchors 110 and 112 are approximately equal in area, the anchors are essentially equal radiators of seismic waves of opposite phase. The connecting rod length is preferably chosen so that the anchors 110 and 112 are spaced approximately one-half of a wave-length apart in order to cause reinforcement of the seismic wave in the vertical direction at the frequency of interest. Seismic waves may also be generated by applying a compressive force to the connecting rod.

From the above it can be seen that a seismic wave generator and method are provided which generate seismic waves in the earth in a relatively economical manner. The apparatus does not destroy or alter the bore hole or the surrounding earth and hence may be "fired" repeatedly to obtain identical "shots" as desired.

The apparatus may be programmed to produce seismic waves at various functions of time. The generator employs the strength of the earth itself to pull against and thereby is capable of generating relatively high powered waves. In this connection, the force that may be applied by the apparatus is limited by the strength of the earth and not by the weight of the apparatus nor by the strength of the materials from which it is made.

It should be realized that, while the above described anchors are preferably employed because of their weight and ease of operation, other constructions of anchors may be employed.

Various other changes and modifications may be made in the above described seismic apparatus and method without deviating from the spirit or scope of the present invention.

Various features of the present invention are set forth in the accompanying claims.

What is claimed is:

1. A method of generating seismic waves in the earth, which method comprises disposing an anchor in a hole in the earth, disposing a second anchor on the surface of the earth, said second anchor contacting substantially more surface area than the cross sectional are of the hole, and applying time varying forces to each of said anchors in the direction of the other of said anchors effective to move each of said anchors in a direction opposite to the direction of movement of the other of said anchors to produce time varying compression of the earth therebetween while keeping the earth between said anchors only in compression.

2. A method of generating seismic waves in the earth, which method comprises disposing an anchor in a hole in the earth, disposing a second anchor on the surface of the earth, said second anchor contacting substantially more surface area than the cross sectional area of the hole, and applying forces periodically to each of said anchors in the direction of the other of said anchors effective to move each of said anchors periodically in a direction opposite to the direction of movement of the other of said anchors to produce periodic compression of the earth therebetween and radiate seismic waves from each of said anchors while keeping the earth between said anchors only in compression, the period of said applied forces in conjunction with the spacing between said anchors being effective to produce said seismic waves in reinforcing relationship.

3. A method of generating seismic waves in the earth, which method comprises disposing a pair of anchors in spaced relationship in the earth, linking said anchors together with link means, and applying only tensioning forces periodically to said link means effective to move each of said anchors in a direction opposite to the direction of movement of the other of said anchors to stress the earth therebetween and radiate seismic waves from each of said anchors, the period of said applied forces in conjunction with said spaced relationship being effective to produce said seismic waves in reinforcing relationship.

4. An apparatus for generating seismic waves comprising means for providing an anchor in a hole in the earth means for providing a second anchor on the surface of the earth, the surface area of the earth contacted by said second anchor being substantially greater than the cross sectional area of the hole, and fluid power means connected to said anchors for applying oppositely directed forces to said anchors effective to move each of said anchors in a direction opposite to the direction of movement of the other anchor, said fluid power means being connected to said anchors to apply said forces to each of said anchors only in the direction of the other of said anchors.

5. An apparatus for generating seismic waves comprising means for providing an anchor in a hole in the earth, means for providing a second anchor on the surface of the earth, the surface area of the earth contacted by said anchor being substantially greater than the cross sectional area of the hole, and fluid power means connected to said anchors for applying oppositely directed forces periodically to said anchors effective to move each of said anchors periodically in a direction opposite to the direction of movement of the other anchor, said anchors being spaced from each other by a distance whereat seismic waves radiated by the respective anchors are reinforcing, said fluid power means being connected to said anchors to apply said forces to each of said anchors only in the direction of the other of said anchors.

6. An apparatus in accordance with claim 4 wherein said power means is capable of applying forces successively to said anchors at predetermined time intervals, and wherein means are provided for at least partially releasing such forces after each such application.

7. An apparatus in accordance with claim 4 wherein said anchors are in essentially vertical alignment with each other.

8. An apparatus in accordance with claim 4 wherein one of said anchors is rigidly connected to a fluid cylinder and the other is rigidly connected to a piston movably carried within said cylinder, and wherein fluid is introduced into said cylinder to cause movement of said piston relative to said cylinder so as to cause movement of said anchors in opposite directions.

9. Apparatus adapted to be disposed in a hole in the earth for generating seismic waves, which apparatus comprises means for providing a first anchor in the hole, means for providing a second anchor in the hole separated from said first anchor, link means interconnecting said anchor providing means, and means connected to said link means for applying only a tensioning force to said link means to thereby stress the earth between the anchors and for releasing the tensioning force.

10. Apparatus for generating seismic waves, which apparatus comprises means for providing an anchor in a hole in the earth, said anchor providing means including a plurality of elongated members, means connected to said members for supporting said members in side-by-side relationship with surfaces thereof facing outwardly, and fluid pressure operated means disposed between said members for causing said members to be pressed outwardly against the wall surface of the hole when said pressure operated means is actuated, a plate disposed on the surface of the earth around said hole, the surface area of the earth contacted by said plate being substantially larger than the cross sectional area of the hole, a rod interengaging said elongated members and said plate, and fluid actuated tensioning means connected to said rod for applying only tension to the same, said tension varying in time, whereby the earth between said anchor and said plate is correspondingly stressed.

References Cited by the Examiner

UNITED STATES PATENTS

| | | | |
|---|---|---|---|
| 1,270,398 | 6/1918 | Fessenden | 181 |
| 3,034,595 | 5/1962 | Thompson | 181 |
| 3,080,924 | 3/1963 | Baker et al. | 166—212 |
| 3,106,982 | 10/1963 | Wade | 181 |

BENJAMIN A. BORCHELT, *Primary Examiner.*

W. KUJAWA, *Assistant Examiner.*